F. H. HALL.
VEHICLE TOP.
APPLICATION FILED JAN. 10, 1921.
1,392,274.
Patented Sept. 27, 1921.
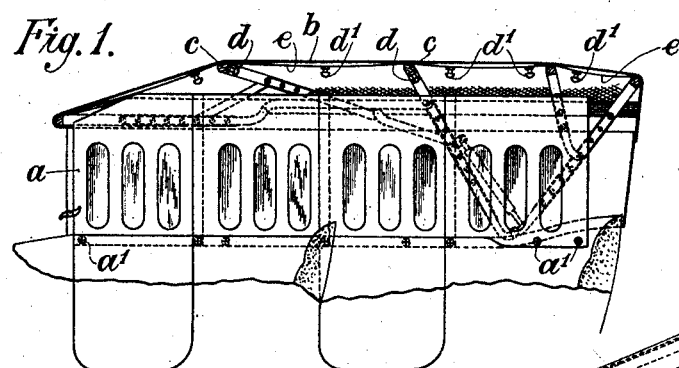
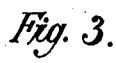
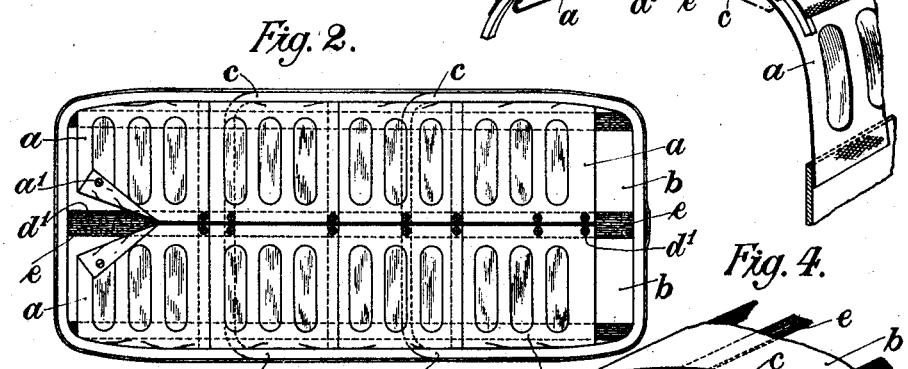
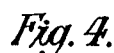
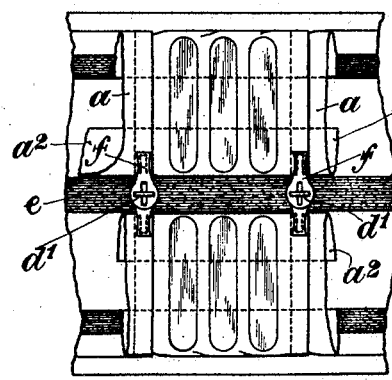
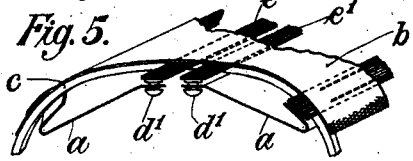
INVENTOR Frederick H. Hall

UNITED STATES PATENT OFFICE.

FREDERICK HAROLD HALL, OF HOLFORD, NEAR BRIDGEWATER, ENGLAND.

VEHICLE-TOP.

1,392,274.   Specification of Letters Patent.   Patented Sept. 27, 1921.

Application filed January 10, 1921. Serial No. 436,271.

(GRANTED UNDER THE PROVISIONS OF THE ACT OF MARCH 3, 1921, 41 STAT. L., 1313.)

*To all whom it may concern:*

Be it known that I, FREDERICK HAROLD HALL, subject of the King of Great Britain, residing at Cleeve Cottage, Holford, near Bridgewater, England, have invented certain new and useful Improvements in Vehicle-Tops, (for which I filed application in England June 24, 1919, Patent No. 151,101,) of which the following is a specification.

This invention relates to automobile and other vehicle tops or hoods of the kind having side curtains adapted to be folded against and secured to the roof portion of the vehicle top or hood and to fold up with the latter when collapsed, as described in my United States Patent No. 1345174 dated the 29th June, 1920.

In certain cases, where the hoop sticks are few in number, it is found desirable to provide for the detachable connection of the free ends of the curtains to the roof portion at points between the hoop sticks as well as to the hoop sticks themselves, but if this connection is made to the covering material of the hood, the latter is liable to sag, due to the weight of the side curtains.

Further, in the case of small narrow cars it is found that the side curtains of opposite sides of the car overlap to a considerable extent when turned up against the roof of the hood.

It is the object of the present invention to obviate these disadvantages.

According to the invention the side curtains are adapted to be secured to flexible bands, straps or the like (which may be the existing bands or straps of the vehicle top or hood), are connected between the hoop sticks, beneath the roof or hood cover, so that the said roof or cover does not have to bear any of the weight of the curtains, and thus sagging is avoided. And, in the case of small narrow cars, in order properly to secure the side curtains to the roof portion, when turned up against the latter, it is proposed to fold back the free edges of the side curtains and to provide the said curtains, at a suitable distance from the free edges, with tabs by which the curtains are adapted to be secured to the roof.

Figure 1 of the accompanying drawings represents a longitudinal section through a motor-car hood or top having means for securing the side-curtains to the roof, in accordance with the present invention.

Fig. 2 is an underside plan showing the curtains folded up and secured in position to the roof portion.

Fig. 3 represents a transverse section through the hood.

Fig. 4 is a similar transverse section, but in which a single row of turn-buttons is employed for securing the lower edges of the curtains to the roof, instead of a double row.

Fig. 5 is a section showing a modification in which two central bands are employed for carrying the turned-up curtains.

Fig. 6 is a transverse section, and

Fig. 7 an underside plan showing how the side curtains have the edges turned back and are secured by tabs, in the case of small narrow cars.

Referring to Figs. 1 to 3, $a$, $a$, are the side-curtains secured at their upper edges in any convenient manner to the sides of the roof portion $b$ of the vehicle top or hood, so as to be adapted to hang down upon opposite sides of the vehicle, their lower edges being secured to the latter in the usual manner by means of turn-buttons or the like engaging eyelets $a^1$, $a^1$. When the side-curtains $a$ are turned up against the hood, when not required for use, as shown in Figs. 2 and 3, the lower edges are arranged to be secured at certain points to the hoop-sticks $c$ by turn-buttons $d$, and at other points, by turn-buttons or the like $d^1$ carried by the central band or web $e$ which runs the length of the hood and which is secured to the said hoop-sticks. The said turn-buttons $d$, $d^1$, are adapted to engage the eyelets $a^1$.

In the form represented in Figs. 1 to 3 the edges of the side curtains are shown attached to the band $e$ by two rows of turn-buttons, each row being employed for securing the curtains upon the respective side of the vehicle; but, as shown in Fig. 4, only a single row of turn-buttons $d^1$ may be employed, same engaging eyelets of the curtains at both sides of the vehicles, said curtains overlapping at the middle of the roof. As shown in Fig. 5, instead of there being only a single center band, there may be two bands $e$, $e^1$, arranged parallel to one another, each band carrying the edges of the curtains upon the respective side of the vehicle.

Referring to Figs. 6 and 7 in order to obviate an excessive overlap of the side curtains of opposite sides of the vehicle, particularly in the case of narrow cars, the free edges of the said curtains $a$ are folded back at $a^2$ so as to lie between the roof and the main portion of the curtain $a$; and the latter is provided, adjacent the part which is folded back, with eyed tabs $f$ which are adapted to be engaged with turn-buttons $d^1$ on the center band $e$, or on the hoop-sticks.

Having fully described my invention, what I desire to claim and secure by Letters Patent is:—

1. A folding vehicle top, comprising a collapsible roof portion, side curtains secured at their upper ends to the roof portion, transversely extending sticks carrying said roof portion, longitudinal flexible means lying beneath the middle of the roof portion and secured solely to the sticks, and means carried by the said flexible means for detachably securing the lower portions of the curtains to said flexible means to relieve the roof portion of the weight of the curtains and permit the latter to be folded with the roof portion in a zigzag manner while attached to the said flexible means.

2. A folding vehicle top comprising a collapsible roof portion, transverse sticks carrying said roof portion, side curtains secured at their upper ends to the opposite sides of the roof portion and having tabs adjacent to the lower portions thereof, longitudinal flexible means lying beneath the middle of the roof portion and secured solely to said sticks, and means carried by the longitudinal flexible means for detachably securing the curtains to the flexible means to provide for folding of the curtains with the roof portion and to relieve the latter of the weight of the curtains.

In testimony whereof I have hereunto set my hand in presence of two subscribing witnesses.

F. H. HALL.

Witnesses:
  W. S. SKERRETT,
  H. O. PRATT.